United States Patent [19]

Gillemot

[11] 3,916,082

[45] Oct. 28, 1975

[54] RETROFIT ENCAPSULATING KIT AND METHOD FOR HERMETICALLY ENCLOSING AN AIR BREATHING SPLICE ASSEMBLY

[75] Inventor: George W. Gillemot, Santa Monica, Calif.

[73] Assignee: John T. Thompson, Los Angeles, Calif. ; a part interest

[22] Filed: Feb. 25, 1974

[21] Appl. No.: 445,359

[52] U.S. Cl. .................. 174/41; 174/72 A; 174/76; 174/92
[51] Int. Cl.² .................... H02G 7/06; H02G 3/04
[58] Field of Search .............................. 174/91–93, 174/76, 41, 60, 88 R, 71 R, 72 R, 68 C

[56] References Cited
UNITED STATES PATENTS

| | | | |
|---|---|---|---|
| 2,891,101 | 6/1959 | Koliss | 174/41 UX |
| 3,060,069 | 10/1962 | Sindars | 174/68 C UX |
| 3,711,633 | 1/1973 | Ghirardi et al. | 174/92 X |
| 3,771,112 | 11/1973 | Thompson et al. | 174/93 UX |
| 3,781,461 | 12/1973 | Thompson et al. | 174/93 |
| 3,836,694 | 9/1974 | Kapell | 174/92 X |
| 3,836,702 | 9/1974 | Plummer | 174/92 |
| 3,838,213 | 9/1974 | Georgiopulos et al. | 174/92 X |
| 3,846,575 | 11/1974 | Troy | 174/41 |

Primary Examiner—Darrell L. Clay
Attorney, Agent, or Firm—Harris, Kern, Wallen & Tinsley

[57] ABSTRACT

A retrofit encapsulating kit and method for hermetically enclosing a conventional air-breathing ready-access splice assembly between a main cable and branchout service cables. The unsheathed length of the main cable is enclosable in a non-conductive shroud with the splice connections projecting outwardly from between the lateral edges of the shroud, the ends of the latter being sealed to the main cable sheath. Readily fragmentable potting compound normally fills the shroud and seals the conductors from corrosive atmospheres, moisture and foreign matter. The kit is equally suitable for use on both a new splicing assembly as well as in retrofitting and encapsulating previously installed air breathing splice assemblies.

9 Claims, 7 Drawing Figures

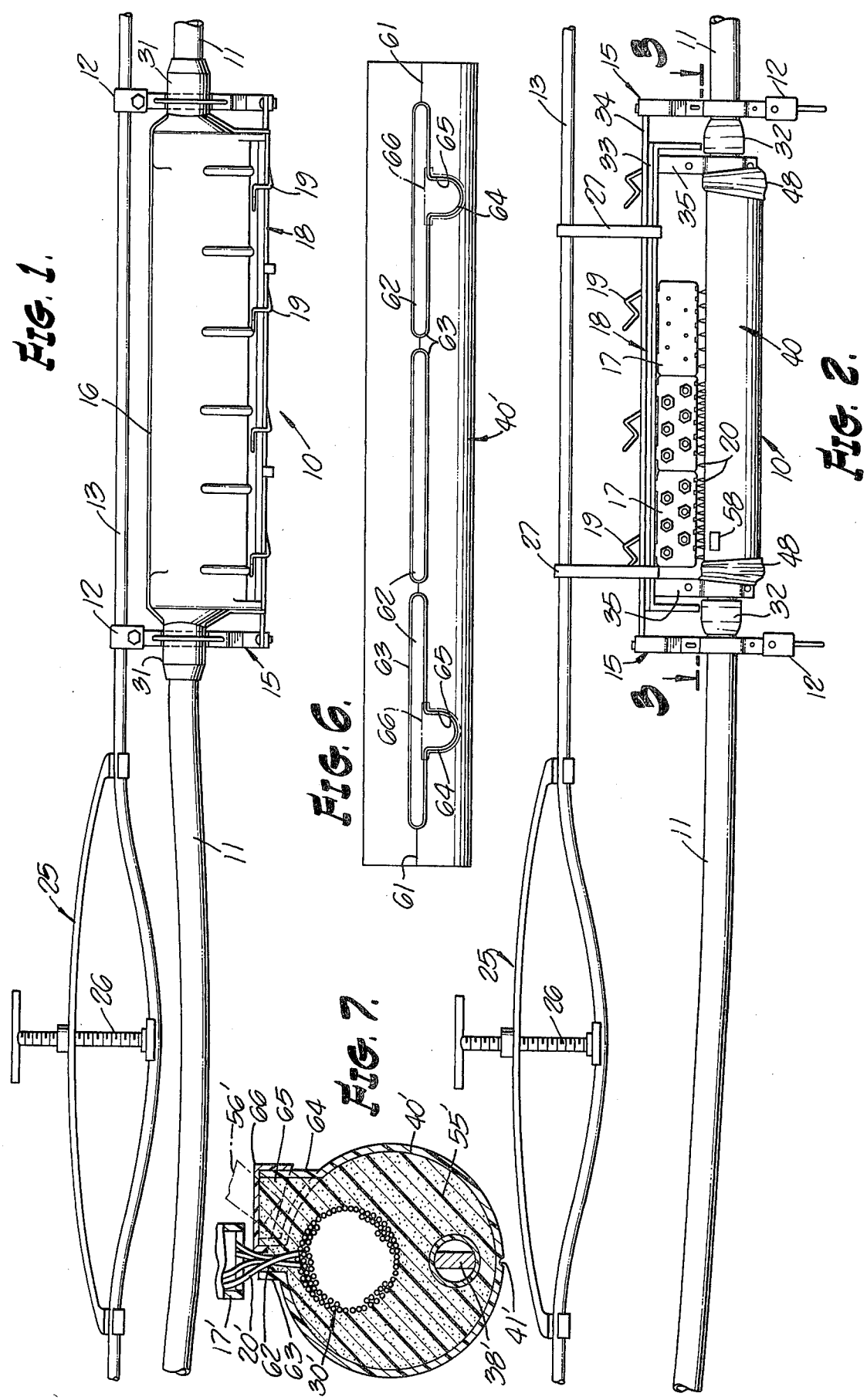

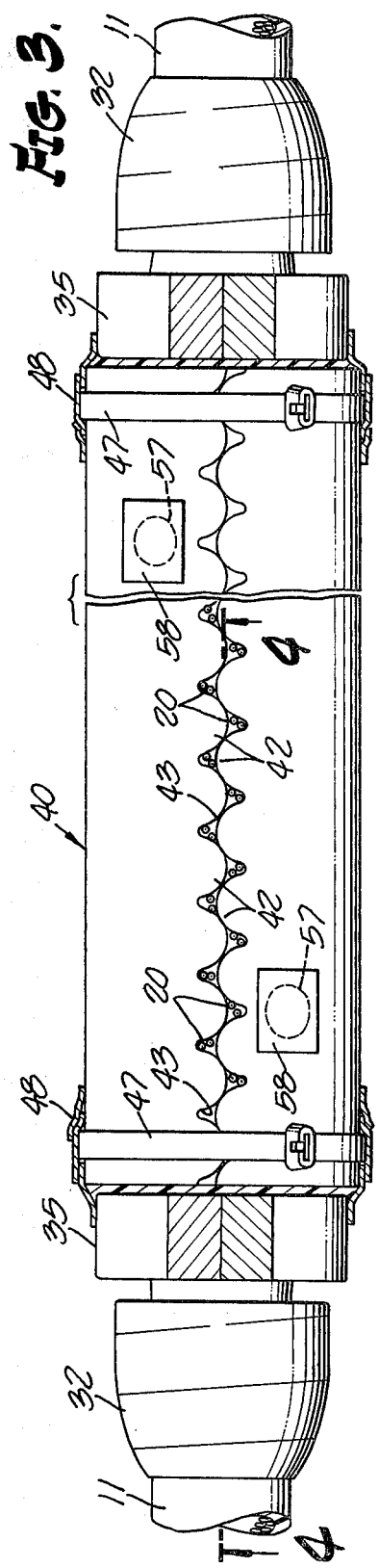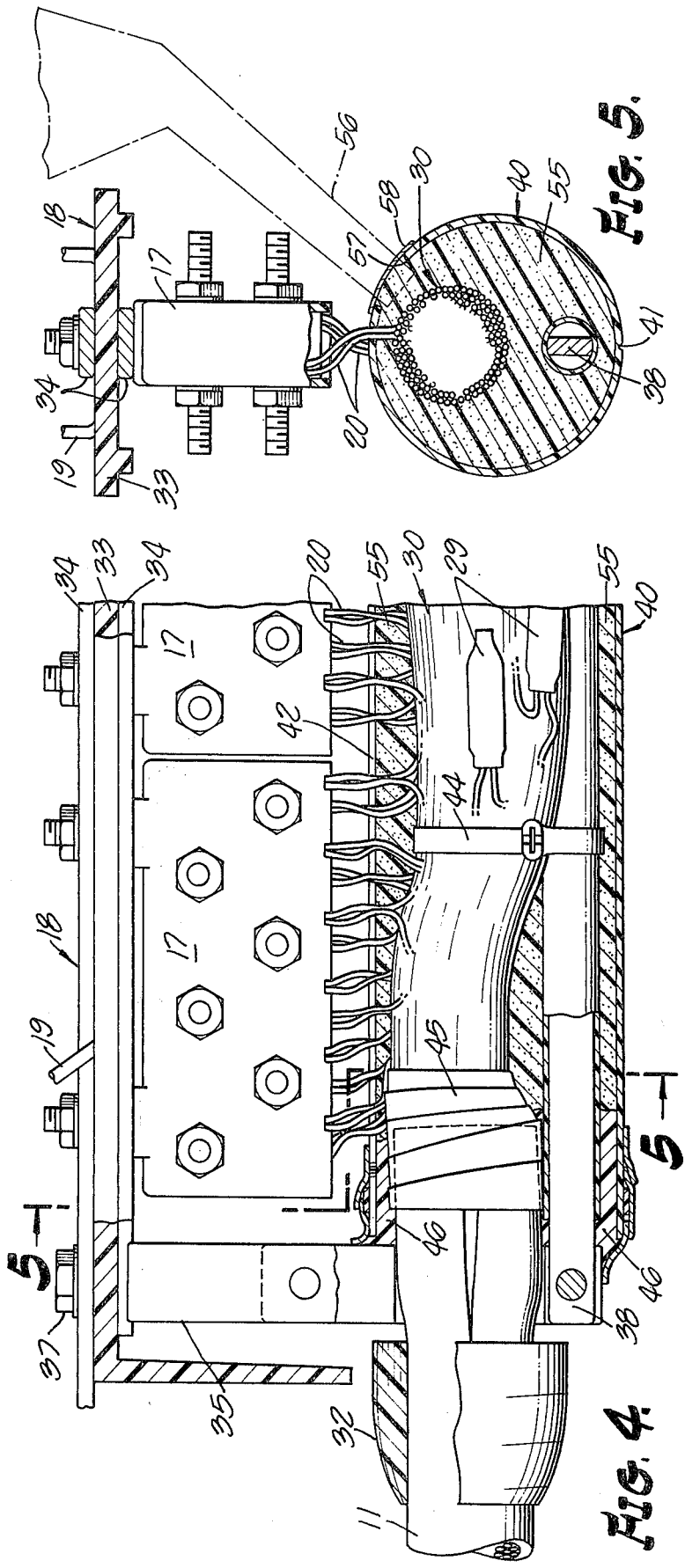

RETROFIT ENCAPSULATING KIT AND METHOD FOR HERMETICALLY ENCLOSING AN AIR BREATHING SPLICE ASSEMBLY

This invention relates to cable splicing assemblies, and more particularly to a kit of components and a method of utilizing the same to provide a hermetically sealed enclosure for the well known and widely used air breathing type branchout splice assembly between a main multiconductor cable and service branchout cabling.

Utility systems utilizing plastic sheath distribution cables customarily employ an air rectangularly type enclosure in completing branchout splice connections to the main multiconductor cable. Such assemblies normally include a main frame bridging the unsheathed portion of the main cable and supporting one or more terminal strips. Splice connections are completed between the main cable and the terminal strips and the latter are then employed to make connections to the branchout service cables. Thereafter, the main frame is enclosed with a longitudinally split waterproof housing which embraces the main frame, the terminal strips and the adjacent ends of the main cable. Despite precautions taken to render the splice waterproof, the complete exclusion of moisture and other contaminants is not possible. This is manifest from the fact that such housings are known as an air breathing type. Such air necessarily contains moisture and corrosive materials which can precipitate during normally prevailing temperature changes or otherwise injure splice components and the operation thereof.

It has not been considered feasible to hermetically seal the splice connections because of the infrequent but nevertheless need at times to gain entry to the cable conductors for test and service purposes. Prior to the present invention there have been no satisfactory and practical proposals advanced for a re-enterable hermetic seal for this type of splice facility with the result that such assemblies are subject to certain hazards. The components provided by the present invention and the mode of utilizing the same satisfied this need and avoids the hazards and deficiencies in the prior art in a highly satisfactory and economical manner.

To this end, the present invention provides a kit of simple, inexpensive components and a method of assembling them to an air-breathing type of cable splice assembly making it a simple matter for personnel having limited training and skill to retrofit an air-breathing splice assembly and convert the same to a hermetically sealed condition quickly and efficiently by means permitting re-entry at any future date in a minimum of time and without risk of injury to the splice connections. These objectives are achieved by inverting the conventional air-breathing splice assembly to support the conductor terminal strips uppermost and directly above the cable splice. While the open splice assembly is held in this position, the splice connections are banded at intervals to hold the conductors compactly gathered. A suitable sealing gasket is applied to the cable sheath at the opposite ends of the unsheathed length of cable following which a split tubular shroud is applied about the splice with its upper lateral edges aligned closely along the opposite sides of the lead wires to the terminal strips. While the ends of this shroud are then held closed against the sealing gaskets, its interior is charged with a potting compound of a type readily fragmented upon need to service the assembly. Preferably, the compound is either of the permanently non-setting gel type or a recently developed liquid compound which takes a permanent set but is readily and quickly fragmented and broken up or crumbled free of the splice wires by rubbing exposed surfaces thereof. After the service operations have been completed, the original or a new shroud is reassembled and charged with fresh compound. After the hermetic seal has been completed, the splice assembly is reversely rotated about its axis by one half a revolution so that the splice wires extend downwardly from the shroud to their connections with the terminal strips. The usual longitudinally split protective housing is then re-installed.

Accordingly, it is a primary object of the present invention to provide a novel kit of components and a method of hermetically sealing an air-breathing type of cable splice assembly by re-enterable means.

Another object of the invention is the provision of a simple, inexpensive kit of components and a method of utilizing the same to hermetically but re-enterably seal an air-breathing type of splice assembly between a main cable and branchout service cables.

Another object of the invention is the provision of a simple, non-conductive longitudinally slit shroud adapted to embrace the unsheathed portion of a cable splice with the branchout service connections passing between the lateral edges of the shroud slit.

Another object of the invention is the provision of a retrofit encapsulating kit adapted for use in encapsulating and hermetically sealing cable splice connections heretofore left accessible to and incompletely shielded from the elements.

These and other more specific objects will appear upon reading the following specification and claims and upon considering in connection therewith the attached drawings to which they relate.

Referring now to the drawings in which a preferred embodiment of the invention is illustrated:

FIG. 1 is a side elevational view of a typical air breathing type cable splice assembly with a cable slack puller attached to its carrier cable;

FIG. 2 is a view similar to FIG. 1 but showing the main frame of the splice assembly rotated one half revolution and suspended below the carrier cable and with the hermetical sealing components assembled thereto;

FIG. 3 is a cross-sectional view taken along line 3—3 and on an enlarged scale;

FIG. 4 is a fragmentary cross-sectional view on a still larger scale taken along line 4—4 on FIG. 3;

FIG. 5 is a cross-sectional view taken along the broken line 5—5 on FIG. 4;

FIG. 6 is a bottom plan view of a second embodiment of the encapsulating shroud; and FIG. 7 is a cross-sectional view on an enlarged scale of the FIG. 7 shroud after assembly and similar to FIG. 5.

Referring initially to FIG. 1, there is shown a typical air breathing type splice assembly, designated generally 10, enclosing an unsheathed portion of a main multiconductor cable 11 and suspended by hanger bracket clips 12, 12 from a conventional carrier cable 13. This assembly is of a well known type having a generally rectangular shaped rigid main frame 15 bridging or straddling the unsheathed portion of the main cable and normally enclosed within an inverted U-shaped impervious cover 16 embracing the splice connections and one or more terminal strips 17. This cover is slit longitudinally of its lower side and held clipped to the edges of the main frame base 18 by spring clips 19. This type of air breathing splice assembly is in widespread commercial use and its details are described more fully in Koliss U.S. Pat. No. 2,891,101 granted June 16, 1959.

As is well known, the splice connections between terminal strips 17 and the various conductors of cable 11 are normally fully exposed within cover 16. While this cover excludes rain, snow and the like, it permits air and air-borne contaminants to move with some degree of freedom between the surrounding atmosphere and the interior of this cover. Accordingly, moisture present in the air can precipitate out onto the parts during temperature changes, causing oxidation and breakdown of metal surfaces and has other harmful effects well known to those experienced in utility distribution systems.

Preliminary to converting such conventional air breathing splice assemblies to a hermetically sealed condition utilizing the principles of this invention, the service man applies a conventional slack puller 25 to carrier cable 13 and tightens the threaded shank 26 against the carrier cable producing slack in main cable 11. Clamps 12, 12 are then loosened, protective cover 16 is detached and the main cable and splice assembly 10 is rotated 180° and suspended so inverted from the carrier cable, as by hanger straps 27 (FIG. 2). The splice connections 20 then extend vertically downwardly from the lower edge of the inverted terminal strips 17 and are joined to conductors of the main cable by well known splice connections, such as those indicated at 29 in FIG. 4.

Referring now more particularly to FIGS. 3-5, it will be understood that, in the conventional air breathing splice assembly, the unsheathed portion of the splice bundle 30 is fully exposed and protected from the elements only by the inverted U-shaped elastomeric cover 16 (FIG. 1). The slit tubular end portions 31, 31 of this cover, when assembled to the cable, snugly embrace the packing rings 32 and the lower edges of this cover are clenched against the opposite lateral edges of base 18 of the main frame by clips 19. However, air is free to enter and escape from the interior of the cover in a restricted manner. It will be understood that main frame 15 includes the insulated base plate 33, a pair of long metal straps 34, between which the base plate is sandwiched, the upright clamp brackets secured to the opposite ends of these brackets by bolts 37, and a metal strap 38 parallel to straps 34, 34. This rigid conductive metal frame not only straddles or bridges the unsheathed portion of the cable, but provides a bonding connection between the shield jackets of the main cable by suitable means forming no part of the present invention.

The assembly of the invention kit components for hermetically sealing splice bundle 30, as here shown by way of example, includes a longitudinally slit shroud 40 of any suitable non-conductive material. As herein shown by way of example, shroud 40 comprises a slit tube extruded from high strength semi-rigid plastic composition of the type disclosed in my copending application for U.S. patent application Ser. No. 445,422, filed Feb. 25, 1974. This material is extremely tough and has pronounced resiliency and is slit from end to end to accommodate the splice lead wires 20, 20 which extend through this slit. Details of this slit will be described more fully presently. The shroud may include a weakened portion 41 (FIG. 5) diametrically opposite the slit and here shown as comprising a continuous shallow groove serving to facilitate hinging and expansion of the two halves of the shroud during lateral assembly of the shroud about splice bundle 30.

Referring to FIG. 3, it will be noted that the slit in the shroud, as there shown, comprises scallops 42 along each edge arranged in staggered relation and appropriately shaped to provide recesses or notches 43 accommodating one or more of the splice connections or lead wires 20 without risk of squeezing these conductors between the edges of adjacent scallops 42, thereby avoiding risk of injury to these leads.

Prior to assembly of the shroud about the splice bundle, splice connections 20, 20 are arranged in a vertical row between the bundle and the terminal units 17. These connections and the conductors of the splice bundle are then wrapped at intervals with tie bands 44 some of which are here shown as encircling the insulated main frame strap member 38. The junctions of the splice bundle with the cable sheath are also served with wrappings of tape 45 followed by the application of a suitable soft gasket material 46 to provide a seal between the ends of shroud 40 and the sheath of the cable 11. This having been accomplished, the operator proceeds to install shroud 40. This is done by grasping the opposite edges of its longitudinal slit and spreading or expanding the shroud sufficiently to insert the splice bundle laterally between the edges of the slit. The shroud is then contracted snugly about the sealing gaskets 46, care being exercised at this point to locate the splice connections 20, 20 in the closest adjacent ones of the notches or recesses 43. The shroud is held snugly closed, as by applying plastic clamping bands 47 about the opposite ends of the shroud and at intermediate points if so desired. The ends of the shroud may also be wrapped with convolutions of sealing tape 48. The shroud is now ready for charging with potting compound.

In view of the frequent need for gaining access to the main conductors of a cable equipped with a ready access type of splice facility, it is not feasible to encapsulate the splice except by a potting compound which can be readily re-entered and removed without risk of injury to the conductors and lead wires. An excellent encapsulant meeting these requirements is disclosed in my copending application for U.S. patent application Ser. No. 445,422, filed Feb. 25, 1974, entitled "Polyurethane Composition Having Easy Re-Entry Property". Reference may be had to that application for a full description of the several polyurethane compositions therein disclosed and highly satisfactory for use with this invention. Each of these compounds is made in two parts one of which parts comprises a pre-polymer and the other part a curing solution for the pre-polymer.

Each part is a liquid as packaged and stored and these are maintained isolated from one another until ready for use. At that time, the two parts are thoroughly intermixed and then poured into the enclosed space to be encapsulated. The pre-polymer and its curing solution react and polymerize to form a solid but easily crumbled and fragmented polyurethane composition, the reaction occurring at normal ambient temperatures and going to completion in several hours.

The cured composition is crystal clear and has a Shore hardness of about 7 to 15. However, the composition has a gel time of 5 to 10 minutes at 70° F. Accordingly, by the time the two parts have been thoroughly intermixed and transferred into the splice housing or shroud, with due care taken to drive out all air pockets, the material is commencing to gel.

The resulting solid potting compound 55 is illustrated in FIGS. 4 and 5 as filling the interior of shroud 40 and is initially charged into the shroud in any convenient manner, as through a funnel 56 indicated in dot and dash line in FIG. 5. The discharge end of this funnel is inserted through an opening 57 in the side wall of shroud 40 (FIGS. 3, 5) as air escapes through the slit and through a second charging port 57 at the opposite end of the shroud. During the filling operation the shroud may be rotated counterclockwise through a small angle of 10°–15° as viewed in FIG. 5 to make certain that all interior portions of the shroud are completely filled. The funnel is then withdrawn and a strip of adhesive tape 58 is placed over opening 57 to avoid risk of loss of the compound before it has gelled. Desirably, a charging opening 57 is formed in each end of shroud 40 in order that air may escape from one opening while the compound or composition is being charged into the other. Also it is desirable to introduce portions of the compound into both openings to expedite and shorten the charging time and to ensure that interior parts are fully charged.

Shroud 40 should be formed of transparent plastic material and this, taken with the completely transparent character of the cured composition, provides the serviceman with a perfect view of the interior at all times and makes it an easy matter to locate any voids or unfilled cavities.

As soon as the sealing tapes 58 have been applied to the charging openings the serviceman may proceed to invert the splice assembly 10 to its upright position with the terminal strips 17 underlying the splice bundle as they are in FIG. 1. The protective cover 16 is then reassembled following which the suspension clamps 12 are assembled about the carrier cable 13. Slack puller 25, 26 is then removed and the encapsulating operation is complete.

Referring now to FIGS. 6 and 7, there is shown an alternate embodiment of the invention encapsulating shroud, the same or similar parts corresponding to those shown in FIGS. 1 to 5 being designated by the same reference characters but distinguished by the addition of a prime. Shroud 40' is molded from transparent tough plastic material and differs from shroud 40 in FIGS. 1–5 only in certain details now to be described. Extending the full length of the shroud is a groove 41', this groove serving to weaken the wall sufficiently to facilitate hinging of the two halves while being expanded for assembly about the splice bundle. Diametrically opposite groove 41' the shroud is slit from end to end as indicated at 61. Major portions of this slit, however, open into short flattened tubular lead wire passages 62, 62 having low height walls 63 of elliptical shape as viewed in FIG. 6. A portion of the wall 63 is enlarged to define an adequately wide charging passage 65 for compound 55'. This charging passage is preferably closed by a snug-fitting molded cap 66 (FIG. 7) snapped in place after the shroud has been charged with encapsulating compound. As shown in FIG. 6, the two end lead wire passages 62, 62 each have a charging port 65, whereas the middle lead wire passage 62 has no such charging passage. As will be appreciated from FIG. 7, the side walls 63, 64 of the lead wire passage and of the charging port 65 terminate at the same level well above shroud 40' when the splice assembly is inverted to the charging position as it is in FIG. 7. Accordingly, it is a simple matter to charge the shroud with potting compound through the charging openings 65, 65 until it overflows the upper edge of the side walls 63. As this occurs the operator is assured that all interior parts have been properly charged. Caps 66 are then snapped into position over the charging openings and the splice assembly is ready for inversion to its normal operating position since the compound takes a gel set in a few minutes after the parts are mixed together.

It will be understood that the alternate encapsulating shroud 40' is assembled about the splice bundle in the same manner as described above in connection with FIGS. 1 to 5 and likewise that its ends are sealed in the same manner to the adjacent ends of the splice bundle. The lead wire openings 62 are quite narrow but sufficient to accommodate the lead wires without risk of injury to the lead wires. The slit edges 61, 61 of the shroud interconnecting the adjacent ends of passages 62 and near the ends of the shroud, abut one another and thereby further safeguard against injury to the lead wires. Also it will be understood that the opposite ends of shroud 40' are wrapped with tape to seal the shroud to the adjacent ends of the splice bundle.

While the particular retrofit encapsulating kit and method for hermetically enclosing an air breathing splice assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. That improvement in a re-enterable cable splice assembly of the free-breathing type having a rigid main frame bridging the cable splice and supporting at least one terminal strip unit interconnecting cable conductors and branchout splice connections and which splice assembly is normally enclosed by a readily detachable protective cover, said improvement comprising: means for sealing the unsheathed length of the main cable including a longitudinally slit non-conductive shroud embracing the unsheathed cable conductors with the splice connections to the cable conductors extending through said slit to said terminal strip unit, and the interior of said shroud being charged substantially from end to end thereof with readily removable potting compound providing a hermetic seal for the full length of the unsheathed portion of the main cable.

2. That improvement defined in claim 1 characterized in that said shroud is circumferentially expandable sufficiently to permit said shroud to be detached laterally from said splice.

3. That improvement defined in claim 1 characterized in that said potting compound is of a permanent setting type which can be readily crumbled and removed from the cable conductors using finger-applied rubbing pressure and without risk of injury to the splice connections and the cable conductors.

4. That improvement defined in claim 1 characterized in that the edge of said slit is irregular in shape thereby providing recesses crosswise thereof accommodating conductors of said splice connections without gripping or damaging to said conductors.

5. That improvement defined in claim 1 characterized in the provision of readily removable clamping band means snugly embracing said shroud and holding juxtaposed edge portions of said slit closed against one another.

6. That improvement defined in claim 1 characterize in that said shroud is provided with at least one compound charging port offset closely beside one edge of said slit.

7. That improvement defined in claim 6 characterized in the provision of closure means closing said charging port.

8. That improvement defined in claim 1 characterized in that said shroud comprises a semi-rigid tube having a groove extending therealong generally opposite said slit and providing a hinge facilitating flexing of the two halves thereof apart while assembling the same about said cable splice assembly.

9. That improvement defined in claim 1 characterized in that said shroud is provided with at least one long narrow opening in communication with and between the opposite ends of said slit to accommodate lead wires extending radially therethrough, and said opening having a low height side wall projecting radially from the inner rim edge of said opening.

* * * * *

UNITED STATES PATENT AND TRADEMARK OFFICE
CERTIFICATE OF CORRECTION

PATENT NO. : 3,916,082
DATED : October 28, 1975
INVENTOR(S) : George W. Gillemot It is certified that error appears in the above-identified patent and that said Letters Patent are hereby corrected as shown below:

Column 1, line 12, "air rectangularly type" should be --air breathing type--;

Column 2, line 64, "rectangular" should be --rectangularly--;

Column 5, lines 28 and 29, "that interior parts" should be --that all interior parts--.

Signed and Sealed this thirteenth Day of April 1976

[SEAL]

Attest:

RUTH C. MASON
Attesting Officer

C. MARSHALL DANN
Commissioner of Patents and Trademarks